United States Patent
Koyama

(10) Patent No.: US 7,313,418 B2
(45) Date of Patent: Dec. 25, 2007

(54) PORTABLE DEVICE

(75) Inventor: Shinichi Koyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 10/859,769

(22) Filed: Jun. 3, 2004

(65) Prior Publication Data
US 2005/0020317 A1 Jan. 27, 2005

(30) Foreign Application Priority Data
Jun. 4, 2003 (JP) .......................... 2003-159405

(51) Int. Cl.
*H04B 1/38* (2006.01)
(52) U.S. Cl. .................. 455/566; 455/575.1; 455/567
(58) Field of Classification Search ............. 455/566, 455/575.1, 567, 90.3, 422.1, 412.1, 412.2
See application file for complete search history.

(56) References Cited

U.S. PATENT DOCUMENTS

| | | | |
|---|---|---|---|
| 6,798,649 B1 * | 9/2004 | Olodort et al. ......... | 455/575.1 |
| 6,976,217 B1 * | 12/2005 | Vertaschitsch et al. ... | 455/575.1 |
| 2002/0106995 A1 * | 8/2002 | Callaway, Jr. ........... | 455/101 |
| 2002/0186382 A1 * | 12/2002 | Gonzalez et al. ........ | 358/1.2 |
| 2003/0064751 A1 * | 4/2003 | Charlier et al. ......... | 455/557 |
| 2004/0023696 A1 * | 2/2004 | Kim ........................ | 455/566 |
| 2004/0203520 A1 * | 10/2004 | Schirtzinger et al. ..... | 455/90.3 |
| 2004/0204130 A1 * | 10/2004 | Khazaka et al. .......... | 455/566 |
| 2004/0214610 A1 * | 10/2004 | Tanemura et al. ........ | 455/566 |

FOREIGN PATENT DOCUMENTS

| | | |
|---|---|---|
| EP | 1143724 A1 | 10/2001 |
| JP | 9-065436 | 3/1997 |
| JP | 10-340073 | 12/1998 |
| JP | 2000-332866 | 11/2000 |
| JP | 2001-136500 | 5/2001 |
| JP | 2002-108757 | 4/2002 |
| JP | 2002-141984 | 5/2002 |
| JP | 2003-032746 | 1/2003 |
| JP | 2003-122339 | 5/2003 |

OTHER PUBLICATIONS

JP Office Action dated Jul. 24, 2007, concerning JP 2003-159405 (English translation).

* cited by examiner

*Primary Examiner*—Joseph Feild
*Assistant Examiner*—Huy D Nguyen
(74) *Attorney, Agent, or Firm*—Morgan & Finnegan LLP

(57) ABSTRACT

A portable device includes a display device, a determination unit and a display control unit. The display device is in a portrait format and displays information relating to the portable device. The determination unit determines whether a digital video image to be displayed on the display device is in a landscape format. The display control unit rotates both the digital video image to be displayed on the display device and the information relating to the portable device by 90 degrees, if it is determined by the determination unit that the digital video image to be displayed on the display device is in the landscape format.

14 Claims, 4 Drawing Sheets

PORTABLE DEVICE

FIELD OF THE INVENTION

The present invention relates to a portable device having a display device, such as a cellular phone or a PDA (Personal Digital Assistant).

BACKGROUND OF THE INVENTION

A conventional cellular phone has a display device long in the vertical direction. A digital video image having a portrait format is displayed on the display device. In recent years, a variety of digital video images to be displayed are increasing. To cope with this, a technique for displaying a digital video image having a landscape format on a display device long in the vertical direction in an easily observable manner has been examined. For example, Japanese Patent Laid-Open No. 2002-108757 (Reference 1) has proposed a server apparatus. When the screen of a cellular phone is long in the vertical direction, the server apparatus rotates a digital video image having a landscape format by 90° and distributes it to the cellular phone.

In the technique described in the Reference 1, however, the digital video image must be rotated by 90° in the server apparatus. Hence, the load on the server apparatus is heavy. This problem becomes more serious as the number of portable devices that access the server apparatus increases.

Although the technique described in the Reference 1 can improve display of a digital video image having a landscape format, a method of displaying other display information such as information to be sent to the user (e.g., information about the cellular phone or information about an image) is not taken into consideration. For this reason, even when a digital video image having a landscape format is rotated by 90° and displayed, information to be sent to the user may be displayed without being rotated by 90°. In this case, the direction of the digital video image is different from that of the information to be sent to the user. Hence, it is not easy to see the information to be sent to the user.

Additionally, in the technique described in the Reference 1, the user of a cellular phone cannot select the direction of rotation of a digital video image having a landscape format.

SUMMARY OF THE INVENTION

The present invention has been made in consideration of the above problem of the prior art, and has as its main object to provide a portable device which can display a digital video image having a landscape format and information to be sent to the user in an easily observable manner.

According to an aspect of the present invention, a portable device having a display device long in a vertical direction, comprising: determination unit adapted to determine whether a digital video image to be displayed on the display device has a landscape format; and display control unit adapted to rotate the digital video image and information about the portable device by 90° when the digital video image to be displayed on the display device has a landscape format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
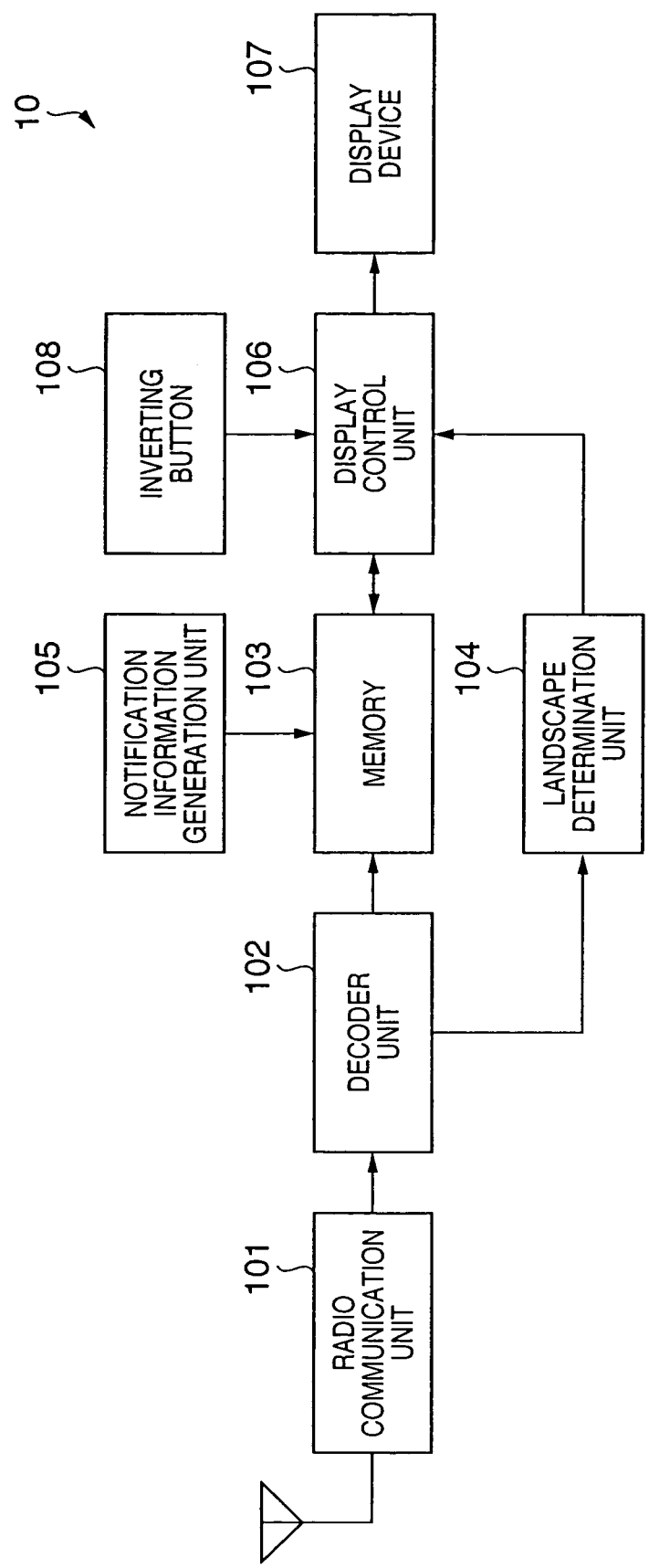
FIG. 1 is a block diagram showing the major constituent elements of a cellular phone 10 as a portable device according to an embodiment of the present invention.

Major constituent elements of a cellular phone 10 as an example of a portable device according to the embodiment of the present invention will be described with reference to FIG. 1.

A radio communication unit 101 can communicate with a distribution server through a communication line such as the Internet. The radio communication unit 101 receives, from the distribution server, a digital video content selected by the user. The digital video content may be based on MPEG-4 Visual (reference: ISO/IEC14496-2: 1999, Information technology—Coding of audio-visual objects—Part 2: Visual, and the like) or any other video encoding method.

A decoder unit 102 decodes the digital video content supplied from the radio communication unit 101. The decoder unit 102 writes, in a predetermined area of a memory 103, the digital video image obtained by decoding the digital video content. In addition, the decoder unit 102 acquires information representing that the digital video image has a landscape format or information representing the aspect ratio of the digital video image from the digital video content and supplies the information to a landscape determination unit 104.

The landscape determination unit 104 determines by using the information supplied from the decoder unit 102 whether the digital video image in the memory 103 has a landscape format. The landscape determination unit 104 supplies the determination result to a display control unit 106.

A notification information generation unit 105 appropriately acquires predetermined information (to be referred to as notification information hereinafter) to be sent to the user from a nonvolatile memory which stores settings of the cellular phone 10 or other constituent elements. The notification information generation unit 105 generates image data representing the notification information and writes the image data in a predetermined area of the memory 103. The notification information contains at least one of information (to be referred to as device information hereinafter) about the cellular phone 10 and information (to be referred to as video attachment information hereinafter) about the digital video image to be displayed on a display device 107. The device information contains at least one of information representing the battery level, information representing the radio field intensity, information representing the current date and time, information representing the presence/absence of an incoming call, information representing the presence/absence of reception of e-mail, and information representing whether the silent mode (a mode in which the user is notified of an incoming call or reception of e-mail not by sound but by vibration) is ON. The video attachment information contains at least one of information representing the playback time (the elapse time from the start of playback) of the digital video image and information representing the URL of the distribution server.

The image data representing the notification information is written in the memory 103 in a direction or layout assuming that the display device 107 should be used in the vertical direction.

When the digital video image in the memory 103 has a portrait format, the display control unit 106 reads out the digital video image and notification information from the memory 103 without rotating them and displays them on the display device 107. When the digital video image in the memory 103 has a landscape format, the display control unit 106 rotates the digital video image and notification information in the memory 103 by 90° clockwise (or counterclockwise). Then, the display control unit 106 reads out the digital video image and notification information from the memory 103 and displays them on the display device 107. If an inverting button 108 is pressed when a digital video image and notification information having a landscape format, which are rotated by 90° clockwise (or counterclockwise), are being displayed, the display control unit 106 further rotates them by 180° and displays them.

The inverting button 108 is prepared as one of operation buttons of the cellular phone 10. The inverting button 108 can also serve as a button to invoke another function.

Figure 2:
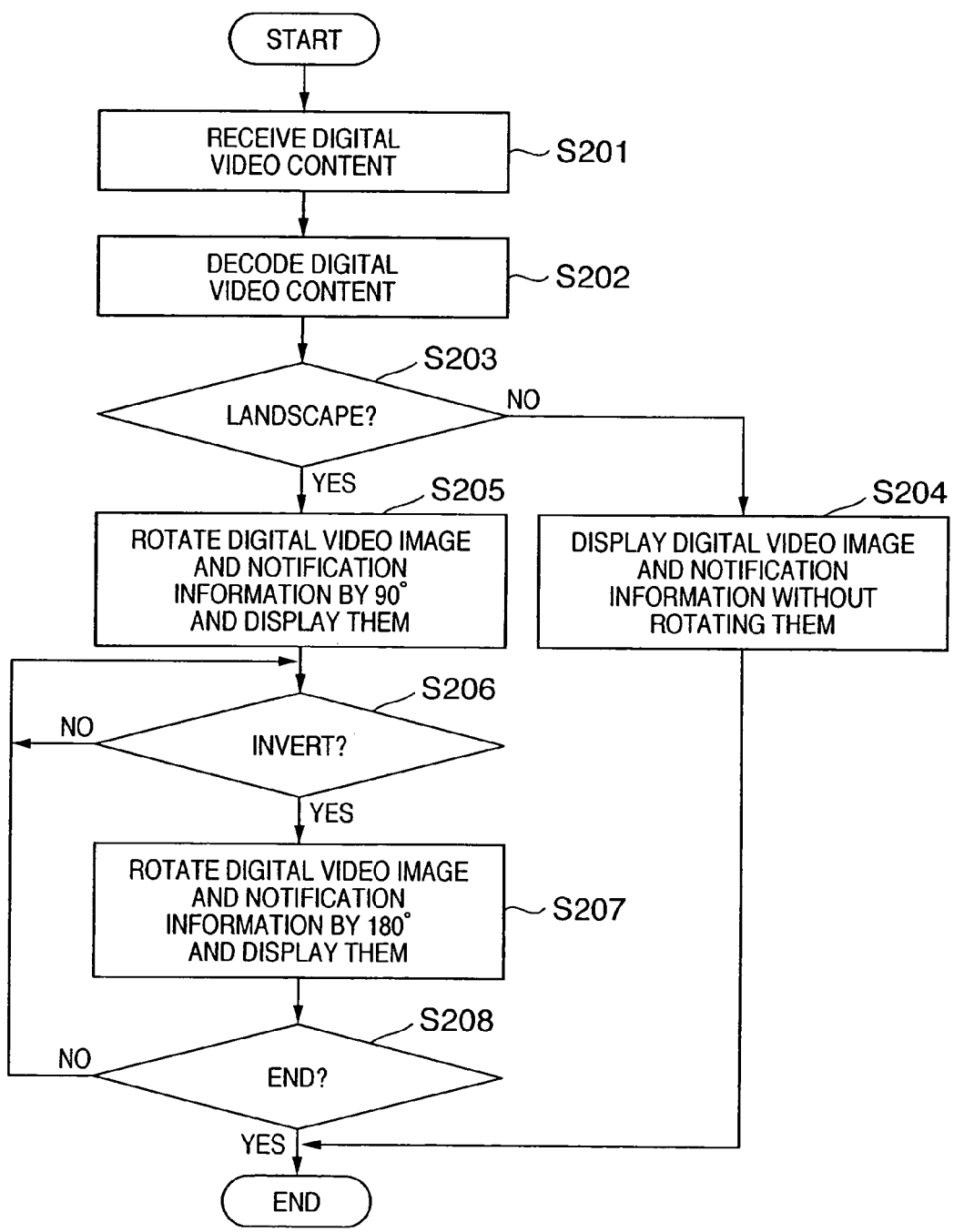
FIG. 2 is a flowchart for explaining one of processing procedures of the cellular phone 10 according to this embodiment.

An example of display processing procedures executed in the cellular phone 10 according to this embodiment will be descried next with reference to the flowchart shown in FIG. 2. FIG. 2 shows processing procedures for displaying a digital video image and notification information, which have a portrait or landscape format.

Step S201: The radio communication unit 101 accesses a distribution server designated by the user, receives, from the distribution server, a digital video content selected by the user, and supplies the received digital video content to the decoder unit 102.

Step S202: The decoder unit 102 decodes the digital video content supplied from the radio communication unit 101 and writes a digital video image obtained from the digital video content in a predetermined area of the memory 103. The decoder unit 102 also acquires information representing that the digital video image has a landscape format or information representing the aspect ratio of the digital video image from the digital video content and supplies the information to the landscape determination unit 104.

Step S203: The landscape determination unit 104 determines by using the information supplied from the decoder unit 102 whether the digital video image in the memory 103 has a landscape format and sends the determination result to the display control unit 106.

Figure 3:
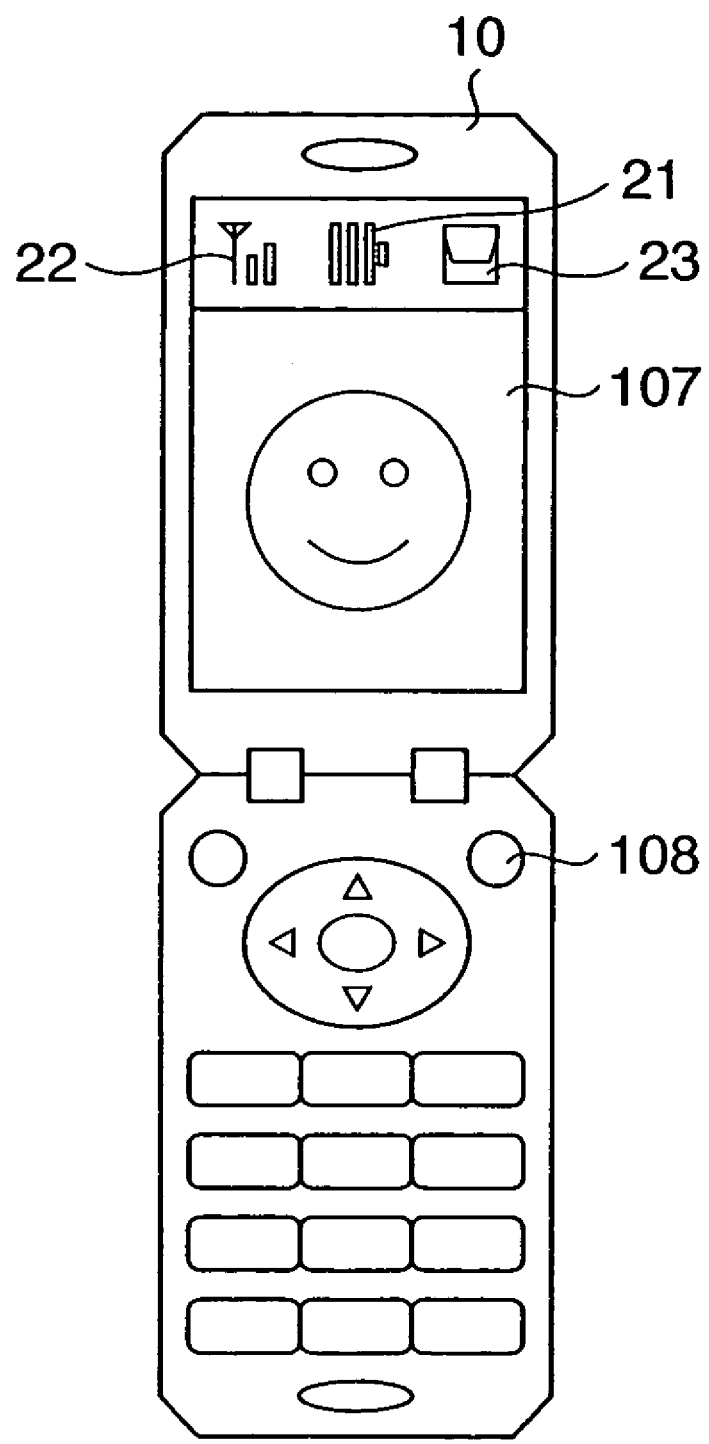
FIG. 3 is a view showing a display example of a digital video image and notification information having a portrait format in the cellular phone 10 according to this embodiment.

Step S204: When the digital video image in the memory 103 has no landscape format (i.e., the digital video image has a portrait format), the display control unit 106 reads out the digital video image and notification information from the memory 103 without rotating them and displays them on the display device 107. FIG. 3 shows an example of a digital video image and notification information having a portrait format, which are displayed on the display device 107 at this time. In the example shown in FIG. 3, notification information containing information 21 representing the battery level, information 22 representing the radio field intensity, and information 23 representing the presence/absence of reception of e-mail is displayed.

Figure 4A:
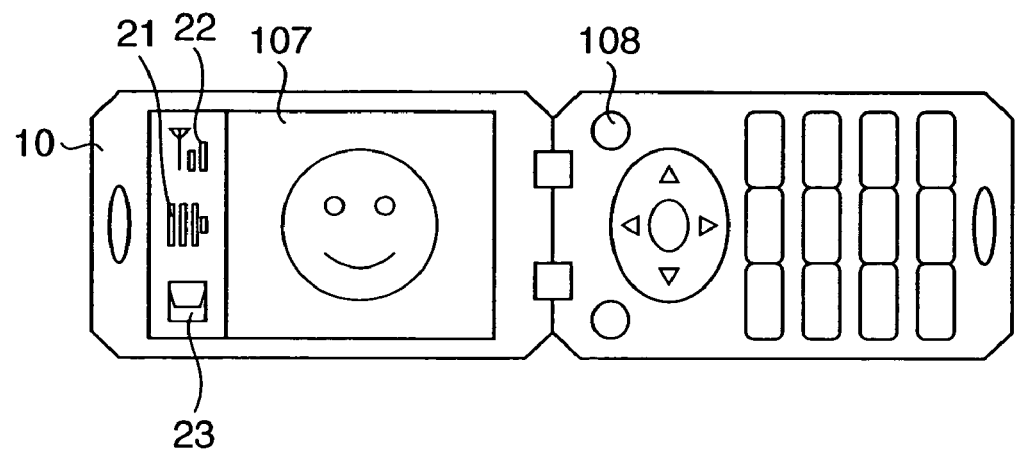
FIGS. 4A and 4B are views showing display examples of a digital video image and notification information having a landscape format in the cellular phone 10 according to this embodiment.

Step S205: When the digital video image in the memory 103 has a landscape format, the display control unit 106 rotates the digital video image and notification information in the memory 103 by 90° clockwise (or counterclockwise). Then, the display control unit 106 reads out the digital video image and notification information from the memory 103 and displays them on the display device 107. FIG. 4A shows a display example of a digital video image and notification information having a landscape format, which are displayed on the display device 107 at this time. In the example shown in FIG. 4A, notification information containing the information 21 representing the battery level, the information 22 representing the radio field intensity, and the information 23 representing the presence/absence of reception of e-mail is displayed. As shown in FIG. 4A, the digital video image and notification information in the memory 103 are rotated by 90° clockwise and displayed in this state on the display device 107.

Step S206: The display control unit 106 determines whether the inverting button 108 is pressed.

Figure 4B:
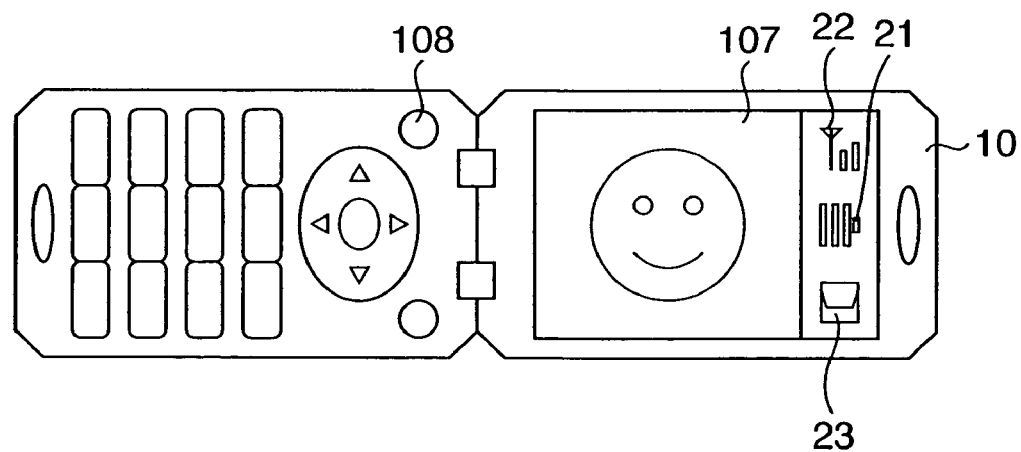

Step S207: If YES in step S206, the display control unit 106 rotates the digital video image and notification information having the landscape format in the memory 103 by 180°. Then, the display control unit 106 reads them out from the memory 103 and displays them on the display device 107. FIG. 4B shows a display example of the digital video image and notification information having a landscape format, which are displayed on the display device 107 at this time. In the example shown in FIG. 4B, notification information containing the information 21 representing the battery level, the information 22 representing the radio field intensity, and the information 23 representing the presence/absence of reception of e-mail is displayed. As shown in FIG. 4B, the digital video image and notification information in the memory 103 are rotated by 90° counterclockwise (i.e., rotated by 180° from the state wherein the digital video image and notification information are rotated by 90° clockwise) and displayed in this state on the display device 107.

Step S208: The display control unit 106 determines whether display of the digital video image is to be ended. If YES in step S208, the flowchart is ended. If NO in step S208, the flowchart returns to step S206.

As described above, according to the cellular phone 10 of this embodiment, when a digital video image to be displayed on the display device 107 has a landscape format, information about the cellular phone 10 can also be rotated by 90° clockwise (or counterclockwise) and displayed together with the digital video image having the landscape format. Hence, the digital video image and information can be displayed in an easily observable manner. In addition, according to the cellular phone 10 of this embodiment, information about the digital video image can also be rotated by 90° clockwise (or counterclockwise) and displayed together with the digital video image having the landscape format. Hence, the information about the digital video image can also be displayed in an easily observable manner. Furthermore, according to the cellular phone 10 of this embodiment, the direction of rotation of the digital video image having the landscape format can be changed by operating the inverting button 108.

Other Embodiment

The present invention is not limited to the above-described embodiment, and various changes and modifications can be made.

For example, the present invention can be practiced in a portable device other than a cellular phone. The main processing of the present invention can be practiced either by a program which is executable by a computer or by a recording medium which records the program.

According to the present invention, a portable device which can display digital video image having a landscape format and information about the portable device displayed together with the digital video image having the landscape format in an easily observable manner can be provided.

In the above embodiment, an arrangement which causes a portable device having a display device long in the vertical direction to display a digital video image having a landscape format has been described. The present invention can also be applied to an arrangement which causes a portable device having a display device long in the horizontal direction to display a digital video image having a portrait format. In other words, the present invention can generally be applied to any portable device using a display device with a display area having an aspect ratio other than 1:1.

As many apparently widely different embodiments of the present invention can be made without departing from the spirit and scope thereof, it is to be understood that the invention is not limited to the specific embodiments thereof except as defined in the appended claims.

What is claimed is:

1. A portable device, comprising:
   a display device which is in a portrait format and displays information relating to the portable device;
   a determination unit adapted to determine whether a digital video image to be displayed on the display device is in a landscape format; and
   a display control unit adapted to rotate both the digital video image to be displayed on the display device and the information relating to the portable device by 90 degrees, if it is determined by the determination unit that the digital video image to be displayed on the display device is in the landscape format.

2. The portable device according to claim 1, wherein the information relating to the portable device includes at least one of three information, the three information including information representing a battery level, information representing a radio field intensity, and information representing a current date and time.

3. The portable device according to claim 1, wherein the information relating to the portable device includes one of two information, the two information including information representing presence of an incoming call and information representing presence of reception of e-mail.

4. The portable device according to claim 1, wherein the information relating to the portable device includes information representing whether a mode in which an incoming call or reception of e-mail is notified by vibration is ON.

5. The portable device according to claim 1, wherein the display device also displays information relating to the digital video image to be displayed on the display device, and the display control unit also rotates the information relating to the digital video image by 90 degrees, if it is determined by the determination unit that the digital video image to be displayed on the display device is in the landscape format.

6. The portable device according to claim 1, wherein the display control unit rotates both the digital video image to be displayed on the display device and the information relating the portable device by 180 degrees in accordance with an instruction from a user, if the digital video image to be displayed on the display device is in the landscape format.

7. The portable device according to claim 1, wherein the portable device is a cellular phone.

8. A method of controlling a portable device, the portable device including a display device which is in a portrait format and displays information relating to the portable device, the method comprising the steps of:
   determining whether a digital video image to be displayed on the display device is in a landscape format; and
   rotating both the digital video image to be displayed on the display device and the information relating to the portable device by 90 degrees, if it is determined in the determining step that the digital video image to be displayed on the display device is in the landscape format.

9. The method according to claim 8, wherein the information relating to the portable device includes at least one of three information, the three information including information representing a battery level, information representing a radio field intensity, and information representing a current date and time.

10. The method according to claim 8, wherein the information relating the portable device includes one of two information, the two information including information representing presence of an incoming call and information representing presence of reception of e-mail.

11. The method according to claim 8, wherein the information relating to the portable device includes information representing whether a mode in which an incoming call or reception of e-mail is notified by vibration is ON.

12. The method according to claim 8, further comprising the steps of:
   displaying information relating to the digital video image to be displayed on the display device; and
   rotating the information relating the digital video image by 90 degrees, if it is determined in the determining step that the digital video image to be displayed on the display device is in the landscape format.

13. The method according to claim 8, further comprising the step of:
   rotating both the digital video image to be displayed on the display device and the information relating to the portable device by 180 degrees in accordance with an instruction from a user, if the digital video image to be displayed on the display device is in the landscape format.

14. The method according to claim 8, wherein the portable device is a cellular phone.

* * * * *

UNITED STATES PATENT AND TRADEMARK OFFICE
CERTIFICATE OF CORRECTION

PATENT NO. : 7,313,418 B2
APPLICATION NO. : 10/859769
DATED : December 25, 2007
INVENTOR(S) : Koyama Page 1 of 1

It is certified that error appears in the above-identified patent and that said Letters Patent is hereby corrected as shown below:

In Column 6, Line 8, after "relating", insert --to--;

Line 33, after "relating", insert --to--; and

Line 45, after "relating", insert --to--;

Signed and Sealed this

Thirteenth Day of May, 2008

JON W. DUDAS
*Director of the United States Patent and Trademark Office*